United States Patent
Park et al.

(10) Patent No.: US 10,353,524 B2
(45) Date of Patent: *Jul. 16, 2019

(54) TOUCH WINDOW AND TOUCH DEVICE INCLUDING THE SAME

(71) Applicant: LG INNOTEK CO., LTD., Seoul (KR)

(72) Inventors: Soung Kyu Park, Seoul (KR); Mun Suk Kang, Seoul (KR); Do Youb Kwon, Seoul (KR); Ji Chang Ryu, Seoul (KR); Seok Pyo Yun, Seoul (KR); Gyu Rin Lee, Seoul (KR); Jin Seok Lee, Seoul (KR); Chung Wan Lee, Seoul (KR); Jae Hak Her, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/914,300

(22) Filed: Mar. 7, 2018

(65) Prior Publication Data

US 2018/0196551 A1 Jul. 12, 2018

Related U.S. Application Data

(63) Continuation of application No. 14/550,435, filed on Nov. 21, 2014, now Pat. No. 9,952,723.

(30) Foreign Application Priority Data

Nov. 22, 2013 (KR) .................. 10-2013-0142807

(51) Int. Cl.
G06F 3/045 (2006.01)
G06F 3/044 (2006.01)

(52) U.S. Cl.
CPC .... *G06F 3/044* (2013.01); *G06F 2203/04102* (2013.01); *G06F 2203/04103* (2013.01); *G06F 2203/04112* (2013.01)

(58) Field of Classification Search
CPC . G06F 2203/04102; G06F 2203/04103; G06F 2203/04112; G06F 3/044
See application file for complete search history.

(56) References Cited

U.S. PATENT DOCUMENTS 8,077,161 B2   12/2011   Kinoshita et al.
8,830,195 B2   9/2014    Eom et al.
(Continued)

FOREIGN PATENT DOCUMENTS

JP   2009-122969   6/2009
JP   2012-053804   3/2012
(Continued)

OTHER PUBLICATIONS

European Search Report dated May 28, 2015 issued in Application No. 14194070.0.
(Continued)

*Primary Examiner* — Insa Sadio
(74) *Attorney, Agent, or Firm* — Ked & Associates, LLP

(57) ABSTRACT

A touch window includes a first electrode disposed on an electrode substrate, an intermediate layer on the electrode substrate, and a second electrode disposed on the intermediate layer. A material of the electrode substrate is different from a material of the intermediate layer.

20 Claims, 9 Drawing Sheets

(56) References Cited

U.S. PATENT DOCUMENTS

| | | | |
|---|---|---|---|
| 9,379,703 | B2 | 6/2016 | Tokuno et al. |
| 2008/0054875 | A1 | 3/2008 | Saito |
| 2008/0165158 | A1 | 7/2008 | Hotelling et al. |
| 2010/0045632 | A1* | 2/2010 | Yilmaz ............... G01D 5/2405 345/174 |
| 2011/0278078 | A1 | 11/2011 | Schediwy et al. |
| 2012/0249465 | A1* | 10/2012 | Lin ..................... G06F 3/041 345/173 |
| 2014/0118009 | A1 | 5/2014 | Cheng et al. |
| 2014/0346317 | A1* | 11/2014 | Cho ..................... G01J 1/42 250/200 |
| 2015/0102284 | A1* | 4/2015 | Garting ................ B82Y 10/00 257/9 |

FOREIGN PATENT DOCUMENTS

| | | |
|---|---|---|
| JP | 2012-079169 | 4/2012 |
| JP | 2012-133428 | 7/2012 |
| JP | 2013-142941 | 7/2013 |
| JP | 2013-156776 | 8/2013 |
| JP | 2013-186706 | 9/2013 |
| KR | 10-2009-0101292 | 9/2009 |
| KR | 10-2012-0044620 | 5/2012 |
| KR | 10-2014-0132265 | 11/2014 |
| WO | WO 2013/155852 | 10/2013 |

OTHER PUBLICATIONS

U.S. Office Action dated Feb. 25, 2016 issued in U.S. Appl. No. 14/550,435.
U.S. Final Office ACtion dated Aug. 16, 2016 issued in U.S. Appl. No. 14/550,435.
U.S. Office Action dated May 3, 2017 issued in U.S. Appl. No. 14/550,435.
U.S. Notice of Allowance dated Oct. 27, 2017 issued in U.S. Appl. No. 14/550,435.
U.S. Notice of Allowance dated Jan. 5, 2018 issued in U.S. Appl. No. 14/550,435.
Japanese Office Action dated Jul. 19, 2018 issued in JP Application No. 2014-234333.
Japanese Office Action dated Mar. 7, 2019 issued in Application No. 2014-234333.

* cited by examiner

TOUCH WINDOW AND TOUCH DEVICE INCLUDING THE SAME

CROSS-REFERENCE

This application is a Continuation Application of prior U.S. patent application Ser. No. 14/550,435 filed Nov. 21, 2014, which claims priority under 35 U.S.C. § 119 to Korean Patent Application No. 10-2013-0142807 filed in Korea on Nov. 22, 2013, whose entire disclosure is hereby incorporated by reference.

BACKGROUND

1. Field

The disclosure relates to a touch window and a touch device including the same.

2. Background

Recently, a touch panel, which performs an input function through the touch of an image displayed on a touch device by an input device, such as a stylus pen, or a hand has been applied to various electronic appliances. The touch panel may be typically classified into a resistive touch panel and a capacitive touch panel.

In the resistive touch panel, the position of the touch point is detected by detecting the variation of resistance according to the connection between electrodes when pressure is applied to an input device. In the capacitive touch panel, the position of the touch point is detected by detecting the variation in capacitance when a finger of the user is touched on the capacitive touch panel between electrodes. When taking into consideration the convenience of fabrication and sensitivity of the screen power, the capacitive touch panel has been spotlighted in a smaller model touch panel.

The demand for a flexible touch panel has been increased. If the touch panel is flexible or bendable, the experience of a user is expanded. However, indium tin oxide (ITO), which is the most widely used material for the transparent electrode of the touch panel, is easily damaged when the substrate is flexed and bent, so that the electrode property is deteriorated. Therefore, the indium tin oxide (ITO) is not suitable for a flexible device. Meanwhile, when a flexible material instead of ITO is used for the transparent electrode, the transparency through flexible material is less than that of ITO due to light reflection.

BRIEF DESCRIPTION OF THE DRAWINGS

The embodiments will be described in detail with reference to the following drawings in which like reference numerals refer to like elements wherein.

DETAILED DESCRIPTION OF THE EMBODIMENTS

Figure 1:
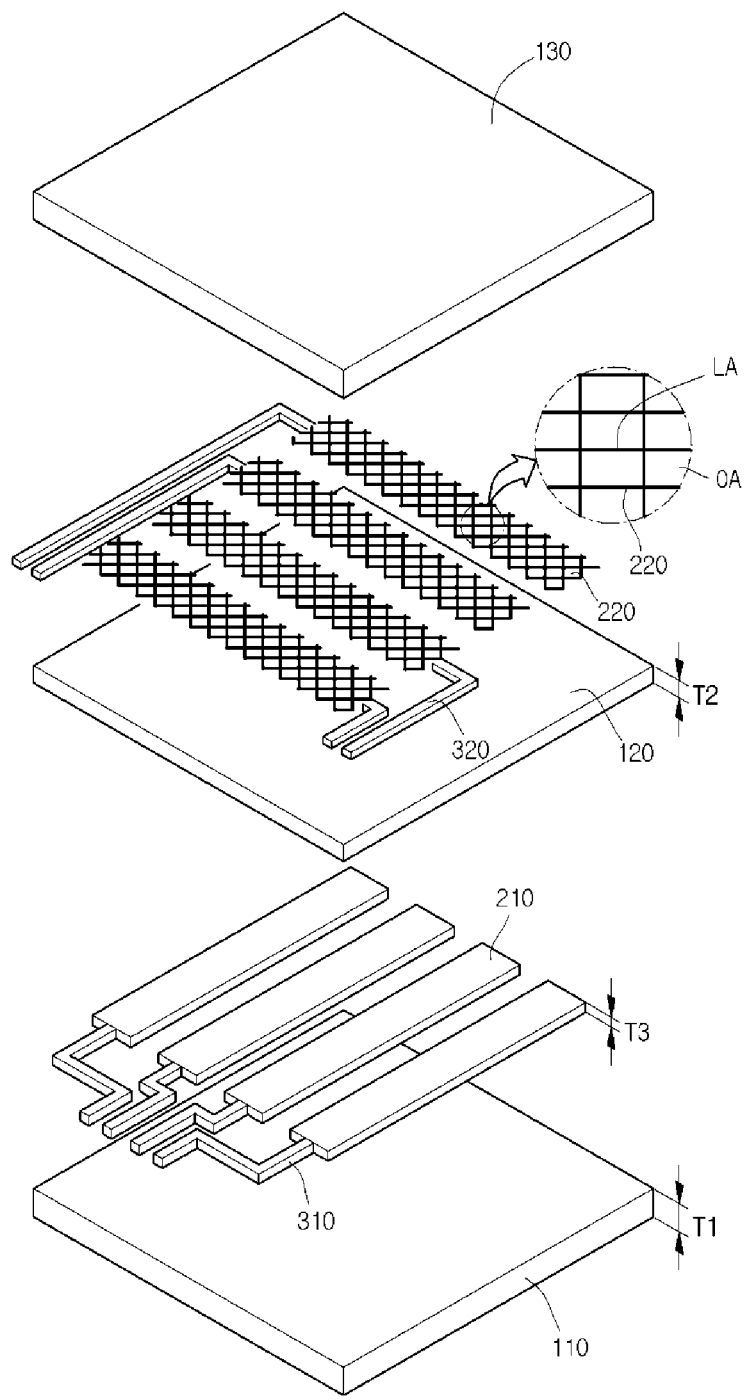
FIG. 1 is an exploded perspective view showing a touch window according to one embodiment.

A touch window according to an embodiment will be described in detail with reference to FIGS. 1 to 10. The touch window according to an embodiment may be a curved touch window or a flexible touch window which is bendable.

The touch window according to an embodiment may include a cover substrate 130, a first electrode 210, an electrode substrate 110, a second electrode 220, an intermediate layer 120, a first wire 310, and a second wire 320.

The cover substrate 130 may be a curved cover substrate and/or a flexible cover substrate which may be bent. The cover substrate 130 may have a constant strength to protect the first electrode 210, the electrode substrate 110, the second electrode 220, the intermediate layer 120, the first wire 310, and the second wire 320. The first electrode 210, the electrode substrate 110, the second electrode 220, the intermediate layer 120, the first wire 310, and the second wire 320 may be disposed below the cover substrate 130.

The cover substrate 130 may include glass. The cover substrate 130 may include chemically tempered glass. The chemically tempered glass includes glass which is chemically tempered. For example, the chemically tempered glass may include soda lime glass or aluminosilicate (Na2O.Al2O3?SiO2) glass. In addition or alternatively, the cover substrate 130 may include plastic film. When the cover substrate 130 includes plastic film, a thickness of the touch window may be reduced.

The electrode substrate 110 may support the first electrode 210. The electrode substrate 110 may include a plastic substrate including a polyethylene terephthalate (PET) film. In addition or alternatively, the electrode substrate 110 may include sapphire. The sapphire has superior electric characteristics, such as permittivity, so that a touch response speed may be greatly increased and a space touch such as hovering may be easily implemented. In addition since the sapphire has a high surface hardness, the sapphire is applicable to a cover substrate. The hovering signifies a technique for recognizing a coordinate even in a position spaced apart from a display by a short distance.

The first electrode 210 may be disposed on the electrode substrate 110. For example, the electrode substrate 110 may include one surface facing the intermediate layer 120 and the opposite surface. The first electrode 210 may be disposed on one surface of the electrode substrate 110.

The first electrode 210 can sense a position of an input device. Although the first electrode is shown in a bar sharp in the drawings, the embodiment is not limited thereto. Thus, the first electrode 210 may be formed in various shapes including a polygonal shape, such as a triangular shape or a diamond shape, a circular shape, an elliptical shape, a linear shape, or an H shape, which can sense the touch of the input device such as a finger of a user.

The first sensing electrode 210 may include a first material. The first material may include transparent conductive film. For example, the first material may include metal oxide such as indium tin oxide, indium zinc oxide, copper oxide, tin oxide, zinc oxide or titanium oxide. The first material may be a material very useful for visibility without interrupting transmission of light.

The first wire 310 is electrically connected to the first electrode 210. The first wire 310 may include a material equal or similar to the first or second electrode 210 or 220. For example, the first wire 310 may be formed of metal having superior electric conductivity. The first wire 310 may include chrome (Cr), nickel (Ni), copper (Cu), aluminum (Al), silver (Ag), molybdenum (Mo), and an alloy thereof.

The intermediate layer 120 may be disposed on the electrode substrate 110. The intermediate layer 120 may be disposed on the first electrode 210. The intermediate layer 120 may support the second electrode 220. At the same time, the intermediate layer 120 may insulate the first and second electrodes 210 and 220 from each other. The intermediate layer 120 may have visible ray transmittance of 79% to 99%.

The intermediate layer 120 may include a material different from the electrode substrate 110. The intermediate layer 120 may include a dielectric material. Since the intermediate layer 120 includes a dielectric material, the thickness of a touch window may be reduced as compared with a thickness of a touch window according to the related art in which the first electrode 210 is formed on one substrate, the second electrode 220 is formed on the other substrate, and then the two substrates are bonded to each other by an adhesive layer. That is, one of two substrates and the adhesive layer may be omitted.

For example, the intermediate layer 120 may include an insulating group including halogen compound of alkali metal or alkali earth metal, such as LiF, KCl, CaF2, or MgF2, or fused silica, such as SiO2, SiNX, etc.; a semiconductor group including InP or InSb; transparent oxide used for semiconductor or dielectric substance including In compound, such as ITO or IZO, mainly used for a transparent electrode, or transparent oxide used for semiconductor or dielectric substance, such as ZnOx, ZnS, ZnSe, TiOx, WOx, MoOx, or ReOx; an organic semiconductor group including Alq3, NPB, TAPC, 2TNATA, CBP or Bphen; and a low-K material such as silsesquioxane or a derivative ((H—SiO3/2)n) thereof, methylsilsesquioxane (CH3-SiO3/2)n), porous silica or porous silica doped with fluorine or carbon atoms, porous zinc oxide (ZnOx), cyclized-perfluoropolymer (CYTOP) or a mixture thereof.

A thickness T2 of the intermediate layer 120 may be less than a thickness T1 of the electrode substrate 110. The thickness T2 of the intermediate layer 120 may be 0.01 to 0.7 times the thickness T1 of the electrode substrate 110. The thickness T2 of the intermediate layer 120 may be 0.05 to 0.5 times the thickness T1 of the electrode substrate 110. The thickness T2 of the intermediate layer 120 may be 0.07 to 0.2 times the thickness T1 of the electrode substrate 110. For example, the thickness T1 of the electrode substrate 110 may be equal to 0.05 mm and the thickness T2 of the intermediate layer 120 may be equal to 0.005 mm.

The intermediate layer 120 may be directly formed on a top surface of the electrode substrate 110. The intermediate layer 120 may be formed by directly coating a dielectric material on the top surface of the electrode substrate 110. Then, the second electrode 220 may be formed on the intermediate layer 120. The thickness can be reduced as compared with a structure according to the related art using two electrode substrates. Specifically, since the intermediate layer 120 may be substituted for one electrode substrate, a touch window having a thin thickness may be secured.

In addition, according to the related art, an optical clear adhesive (OCA) is additionally required between stacked two electrode substrates. However, according to the embodiment, one electrode substrate is used and the second electrode 220 is formed on the intermediate layer 120, so that the optical clear adhesive may be omitted. Therefore, the cost may be reduced.

The touch window having a thin thickness is secured through the intermediate layer 120, so that the transmittance may be improved. In addition, the first or second electrode 210 or 220 may be prevented from being cracked. Therefore, the bending property and reliability of the touch window may be improved.

The second electrode 220 is disposed on the intermediate layer 120. For example, the intermediate layer 120 may include one surface facing the cover substrate 120 and the opposite surface to the one surface, and the second electrode 220 may be disposed on one surface of the intermediate layer 120. The first electrode 210 may be disposed on one surface of the electrode substrate 110 and the second electrode 220 may be disposed on one surface of the intermediate layer 120. However, the embodiment is not limited to the above, but the first electrode 210 may be disposed on the opposite surface of the electrode substrate 110 and the second electrode 220 may be disposed on the opposite surface of the intermediate layer 120.

The second electrode 220 may include a material equal to or different from the first electrode 210. For example, the second material may include at least one of an interconnecting structure, a carbon nanotube, graphene, conductive polymer, a transparent electrode such as ITO, and various metals, and the first and second electrodes 210 and 220 may include the same material or mutually different materials.

In this case, the interconnecting structure may include a microstructure having a diameter in the range of 10 nm to 200 nm. The interconnecting structure may include a microstructure having a diameter in the range of 20 nm to 100 nm. The interconnecting structure may include a nanowire. In addition, the interconnecting structure may include a metallic nanowire. In addition, when the second material is a metal, the second material may include chrome (Cr), nickel (Ni), copper (Cu), aluminum (Al), silver (Ag), molybdenum (Mo), and an alloy thereof. The second materials have a flexible property which may be applied for the warp and bending of a substrate.

As shown in FIG. 1, the second electrode 220 may include the second material and a conductive pattern. That is, the second electrode 220 may be disposed in a mesh shape. Since the second electrode 220 is disposed in the conductive pattern shape, so that the second electrode 220 includes a pattern opening OA and a pattern line LA. In this case, a line width of the pattern line LA may be in the range of 0.1 μm to 10 μm. A pattern line LA of 0.1 μm or less may not be formed due to the characteristics of the manufacturing process. If the line width is 10 μm or less, the pattern of the second electrode 220 may not be viewed. Preferably, the line width of the pattern line LA may be in the range of 1 μm to 5 μm.

The pattern opening OA may have a rectangular shape, but the embodiment is not limited thereto. The pattern opening OA may have various shapes such as a polygonal shape including a diamond shape, a pentagonal shape or a hexagonal shape, or a circular shape.

As the second electrode 220 has a mesh shape, the pattern of the second electrode 220 may not be viewed in a display area. In other words, even when the second electrode 220 is formed of metal, the pattern may not be visible. In addition, even when the second electrode 220 is applied to a large-size touch window, the resistance of the touch window may be reduced. Further, when the second electrode 220 is formed through a printing process, the printing quality may be improved, so that the high quality of a touch window may be secured.

Meanwhile, the first electrode 210 occupies the electrode substrate 110 in a first area and the second electrode 220 occupies the intermediate substrate 120 in a second area, the second area may be less than the first area. According to the embodiment, since the second electrode 220 includes the pattern opening OA and the top surface of the second is exposed, the second area is less than the first area.

The second wire 320 is electrically connected to the second electrode 220. The second wire 320 may include a material equal or similar to the first or second electrode 210 or 220. For example, the second wire 320 may be formed of metal having superior electric conductivity. The second wire 320 may include chrome (Cr), nickel (Ni), copper (Cu), aluminum (Al), silver (Ag), molybdenum (Mo), and an alloy thereof.

In this case, the first and second wires 310 and 320 may be connected to a circuit board. Various circuit boards may serve as the circuit board. For example, a flexible printed circuit board (FPCB) may serve as the circuit board. Specifically, according to the embodiment, since the intermediate layer 120 having a thin thickness is used, the first and second wires 310 and 320 may be disposed on the same plane. Thus, one single-sided circuit board may be used. Although not shown, an adhesive layer may be interposed between the cover substrate 130 and the electrode substrate 110. For example, the adhesive layer may include an optical clear adhesive (OCA) or photosensitive film.

Figure 2:
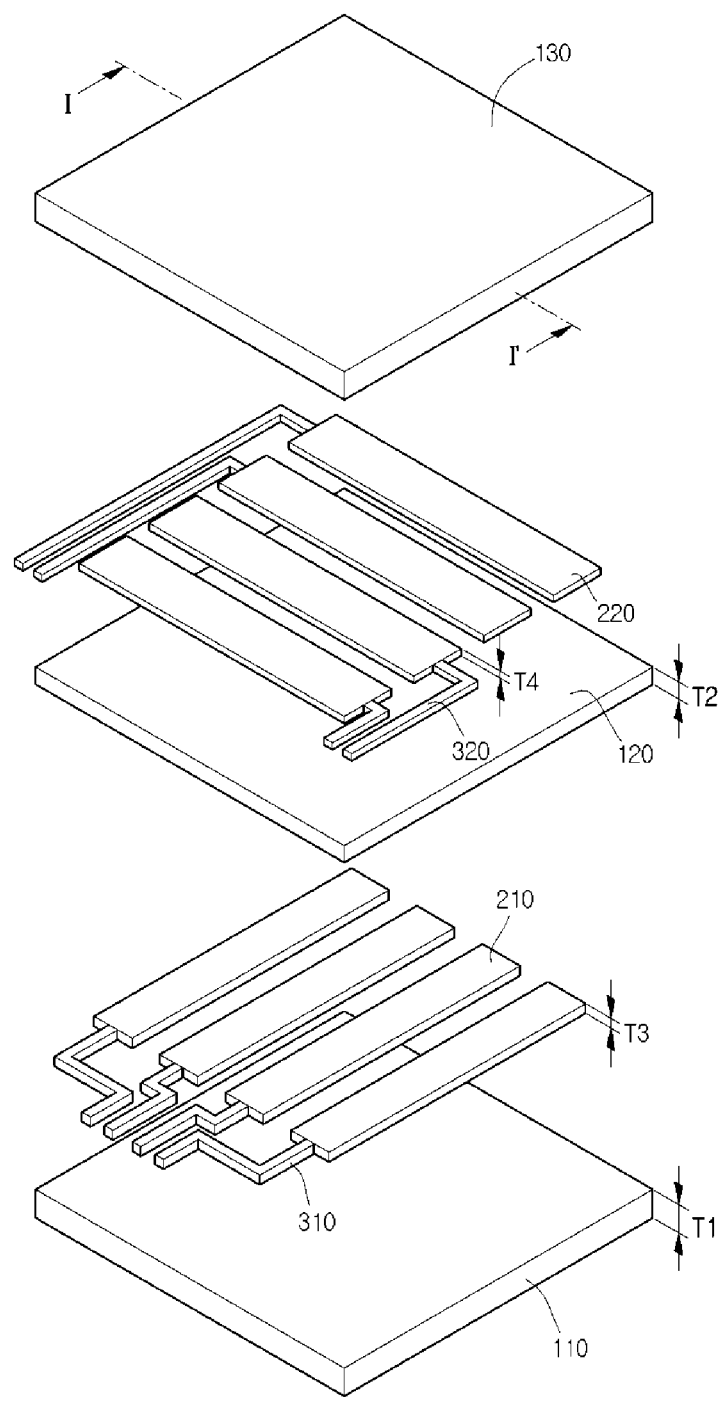
FIG. 2 is an exploded perspective view showing a touch window according to another embodiment.
Figure 3:
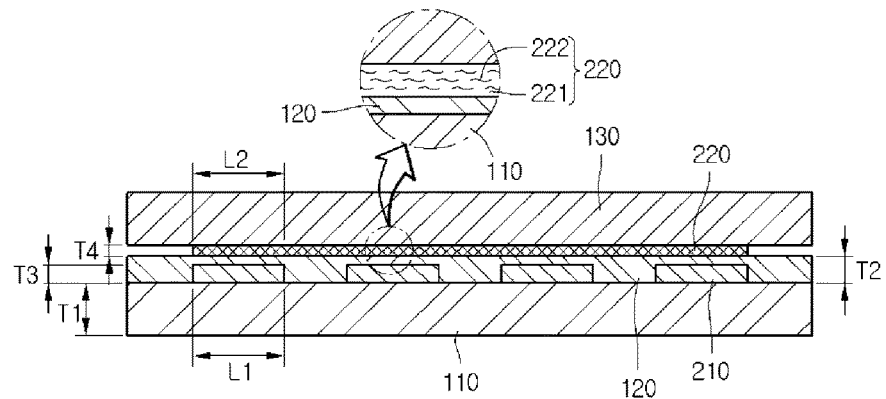
FIGS. 3 and 4 are sectional views taken along line I-I' of FIG. 1.

Referring to FIGS. 2 and 3, the second electrode 220 may include a nanowire 222 in another embodiment. The second electrode 220 may include a metallic nanowire 222. The second electrode 220 may include photosensitive nanowire film in which a nanowire 222 is disposed in a photosensitive material.

The second electrode 220 may include the photosensitive nanowire film, so that the thickness of the second electrode 220 may be reduced. In other words, the second electrode 220 includes the nanowire 222, and the whole thickness of the second electrode 220 can be reduced. In related art, when an electrode includes the nanowire 222, an overcoating layer must be additionally formed to prevent the nanowire 222 from being oxidized, resulting in complicated fabricating process and increased thickness of the touch window. However, according to the embodiment, the nanowire 222 is provided in the photosensitive material so that the nanowire 222 may be prevented from being oxidized without any overcoating layers.

A thickness T4 of the second electrode 220 may be in the range of 1 μm to 6 μm. The thickness T4 of the second electrode 220 may be in the range of 2 μm to 5 μm. The thickness T4 of the second electrode 220 may be less than a thickness T3 of the first electrode 210. Therefore, the thicknesses of the first and second electrodes 210 and 220 may be reduced as compared with a case where the first and second electrodes 210 and 220 include the same first material.

Figure 4:
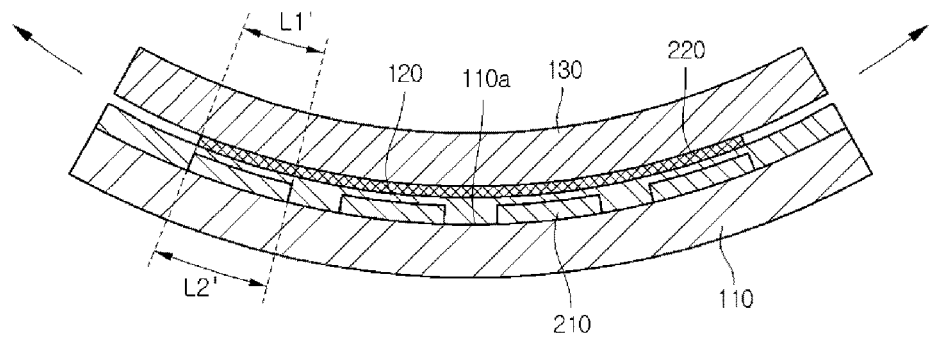

Referring to FIG. 4, the electrode substrate 110 may be a curved electrode substrate or a flexible electrode substrate. Although the electrode substrate entirely bent is depicted in FIG. 4, the embodiment is not limited thereto and the electrode substrate may be bent to have a partial curved surface. That is, the electrode substrate may be bent to have a partial flat surface and a partial curved surface. In detail, an end of the electrode substrate 110 may be bent to have a curved surface or may be bent or flexed to have a surface including a random curvature.

The first and second electrodes 210 and 220 may be disposed on an inside surface 110a of the electrode substrate 110 bent. That is, the first and second electrodes 210 and 220 may be disposed on a contracted surface 110a of the electrode substrate 110. Although the first electrode 210 which is disposed on one surface of the electrode substrate 110 and the second electrode 220 which is disposed on one surface of the intermediate surface 120 are depicted in FIG. 4, the embodiment is not limited thereto. The first electrode 210 may be disposed on the opposite surface of the electrode surface 110, and the second electrode 220 may be disposed on the opposite surface of the intermediate layer 120. In addition, in this case, the electrode substrate 110 may be bent in a direction opposite to a bending direction shown in FIG. 4, and the first and second electrodes may be disposed on a curved inside surface, that is, a contracted surface.

In this case, compressive force may be operated on the first and second electrodes 210 and 220. That is, lengths of the first and second electrodes 210 and 220 may be reduced than original lengths of them. In this case, a modulus of strain of the second electrode 220 is greater than that of the first electrode 210. That is, the difference (L2−L2') between the length L2 of the second electrode 220 which is not bent and the length L2' of the second electrode 220 which is bent to be contracted is greater than the difference (L1−L1') between the length L1 of the first electrode 210 which is not bent and the length L1' of the first electrode 210 which is bent to be contracted.

In other words, a degree of a length variation (L2−L2') of the second electrode 220 when the second electrode 220 is bent is greater than a length variation (L1−L1') of the first electrode 210 when the first electrode 210 is bent. The second electrode 220 includes a second material and has a thinner thickness, so that the second electrode 220 may endure against a greater length variation when the touch window is bent. That is, although the modulus of strain of the second electrode 220 is greater than that of the first electrode 210, the second electrode 220 may be bent without physical damage.

Figure 5:
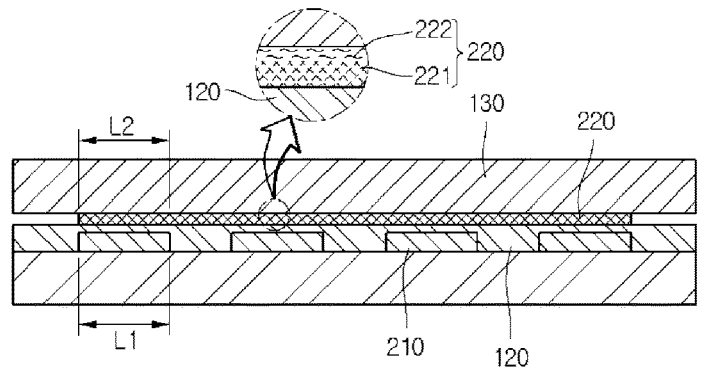
FIGS. 5 to 10 are sectional views showing a touch window according to another embodiment.

Referring to FIG. 5, the second electrode 220 of a touch window according to another embodiment includes a base material 221 and a nanowire 222. The base material 221 includes a photosensitive material. Since the base material 221 include the photosensitive material, the second electrode 220 may be formed through exposure and development processes.

The nanowire 222 may be disposed only at an upper portion of the second electrode 220. For example, the nanowire 222 may exist in the region of the depth from the upper portion of the second electrode 220 to 1 μm. Preferably, the nanowire 222 may exist in the region of the depth from the upper portion of the second electrode 220 to 100 nm.

Figure 6:
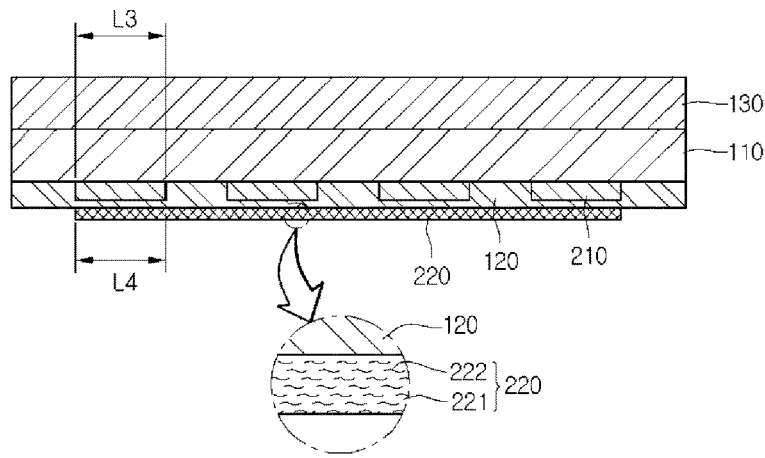
Figure 7:
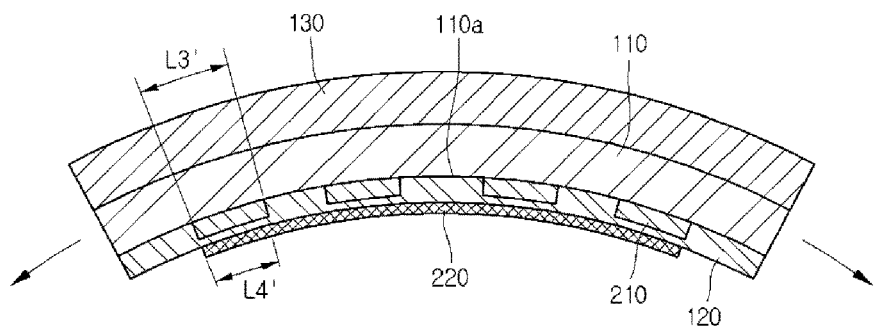
Figure 8:
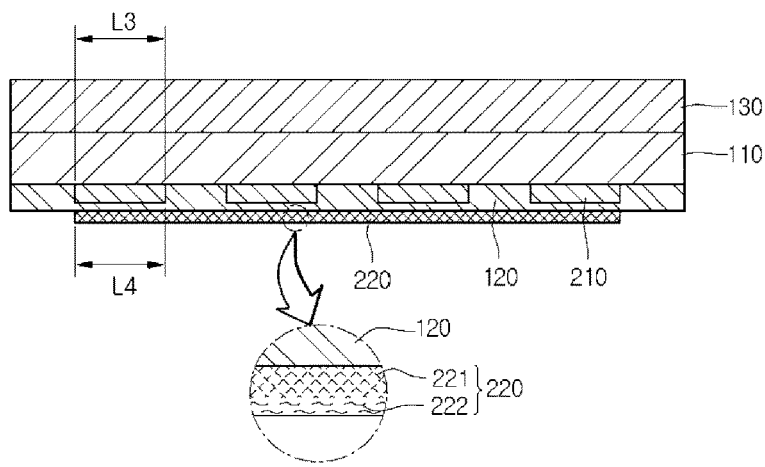

Referring to FIGS. 6 and 7, a touch window according to another embodiment has a stack-up structure different from that of the touch window depicted in FIG. 3. In detail, according to the touch window of another embodiment, a cover substrate 130, an electrode substrate 110, a first electrode 210, an intermediate layer 120 and a second electrode 220 may be sequentially laminated.

Referring to FIG. 7, the electrode substrate 110 may be a curved electrode substrate or a flexible electrode substrate which may be bent. The first and second electrodes 210 and 220 may be disposed on a curved inside surface 110a of the electrode substrate 110. The first and second electrodes 210 and 220 may be disposed on a contracted surface 110a of the electrode substrate 110.

In this case, compressive force may be operated on the first and second electrodes 210 and 220. That is, the lengths of the first and second electrodes 210 and 220 may be reduced than the original lengths of them. In this case, a modulus of strain of the second electrode 220 is greater than that of the first electrode 210. That is, the difference (L4−L4') between the length L4 of the second electrode 220 which is not bent and the length L4' of the second electrode 220 which is bent is greater than the difference (L3−L3') between the length L3 of the first electrode 210 which is not bent and the length L3' of the first electrode 210 which is bent.

In other words, a length variation (L4−L4') of the second electrode 220 when the second electrode 220 is bent is greater than a length variation (L3−L3') of the first electrode 210 when the first electrode 210 is bent. The second electrode 220 includes a second material and has a thinner thickness, so that the second electrode 220 may endure against a greater length variation when the touch window is bent. That is, although the modulus of strain of the second electrode 220 is greater than that of the first electrode 210, the second electrode 220 may be bent without physical damage.

Referring to FIG. 7, the second electrode 220 of a touch window according to another embodiment includes a base material 221 and a nanowire 222. The base material 221 includes a photosensitive material. Since the base material 221 include the photosensitive material, the second electrode 220 may be formed through exposure and development processes.

The nanowire 222 may be disposed only at a lower portion of the second electrode 220. For example, the nanowire 222 may exist in the region of a height from the lower portion of the second electrode 220 to 100 nm.

As the nanowires 222 go away from the cover substrate 130, the concentration of the nanowires 222 may be gradually increased. That is, as the nanowires 222 approach to a lower surface of the base substrate 221, the concentration of the nanowires 222 may be gradually increased. In this case, the concentration of the nanowires 222 may correspond to the number of nanowires 222 existing in the same vacuum. In addition, as the nanowires 222 go away from the intermediate layer 120, the concentration of the nanowires 222 may be gradually increased.

Figure 9:
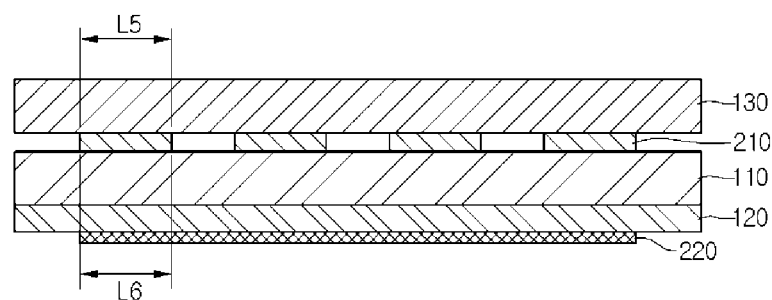
Figure 10:
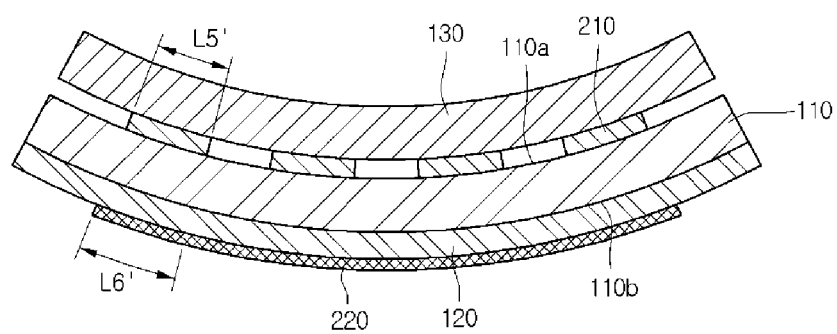

Meanwhile, referring to FIGS. 9 and 10, according to a touch window of still another embodiment, a cover substrate 130, a first electrode 210, an electrode substrate 110, an intermediate layer 120 and a second electrode 220 may be sequentially laminated. That is, while the electrode substrate 110 is interposed between the first electrode 210 and the intermediate layer 120, the first electrode 210 and the intermediate layer 120 may be disposed on both surfaces of the electrode substrate 110, respectively.

Referring to FIG. 10, the electrode substrate 110 may be a curved electrode substrate or a flexible electrode substrate which may be bent. The first electrode 210 may be disposed on a curved inside surface 110a of the electrode substrate 110. The second electrode 220 may be disposed on an outside surface 110b of the electrode substrate 110 bent.

In this case, tension may be operated on the first and second electrodes 210 and 220. That is, a length of the first electrode 210 may be lengthened than an original length of the second electrode 220. In this case, a modulus of strain of the second electrode 220 is greater than that of the first electrode 210. That is, the difference (L6−L6') between the length L6 of the second electrode 220 which is not bent and the length L6' of the second electrode 220 which is bent to be lengthened is greater than the difference (L5−L5') between the length L5 of the first electrode 210 which is not bent and the length L5' of the first electrode 210 which is bent to be reduced. In other words, a degree of a length variation (L6−L6') of the second electrode 220 when the second electrode 220 is bent is greater than that (L5−L5') of the first electrode 210. The second electrode 220 includes a second material and has a thinner thickness, so that the second electrode 220 may endure against a greater length variation when the touch window is bent. That is, the second electrode 220 may be bent without physical damage.

Hereinafter, a touch device, in which the touch window described above is coupled with a display panel, will be described with reference to FIGS. 11 and 12.

If the display panel 2000 is a liquid crystal display panel, the display panel 2000 may have a structure in which the first substrate 2100 including a thin film transistor (TFT) and a pixel electrode is combined with the second substrate 2200 including color filter layers while a liquid crystal layer is interposed between the first and second substrates 2100 and 2200.

Further, the display panel 2000 may be a liquid crystal display panel having a color filter on transistor (COT) structure formed by combining the first substrate 2100 formed thereon with the TFT, a color filter, and a black matrix with the second substrate 2200 while the liquid crystal layer is interposed between the first and second substrates 2100 and 2200. In other words, the TFT may be formed on the first substrate 2100, a protective layer may be formed on the TFT, and the color filter layer may be formed on the protective layer. In addition, the pixel electrode, which makes contact with the TFT, is formed on the first substrate 2100. In this case, to improve an aperture ratio and simplify a mask process, the black matrix may be omitted, and a common electrode may perform a function of the black matrix together with the inherent function thereof.

In addition, when the display panel 2000 is a liquid crystal panel, the display device may further include a backlight unit for supplying light onto a rear surface of the display panel 2000.

When the display panel 2000 is an organic light emitting device, the display panel 2000 includes a self light-emitting device which does not require any additional light source. A thin film transistor is formed on the first substrate 2100 of the display panel 2000, and an organic light-emitting device (OLED) making contact with the thin film transistor is formed. The OLED may include an anode, a cathode and an organic light-emitting layer formed between the anode and the cathode. In addition, the display panel 2000 may further include the second substrate 2200, which performs the function of an encapsulation substrate for encapsulation, on the OLED.

Figure 11:
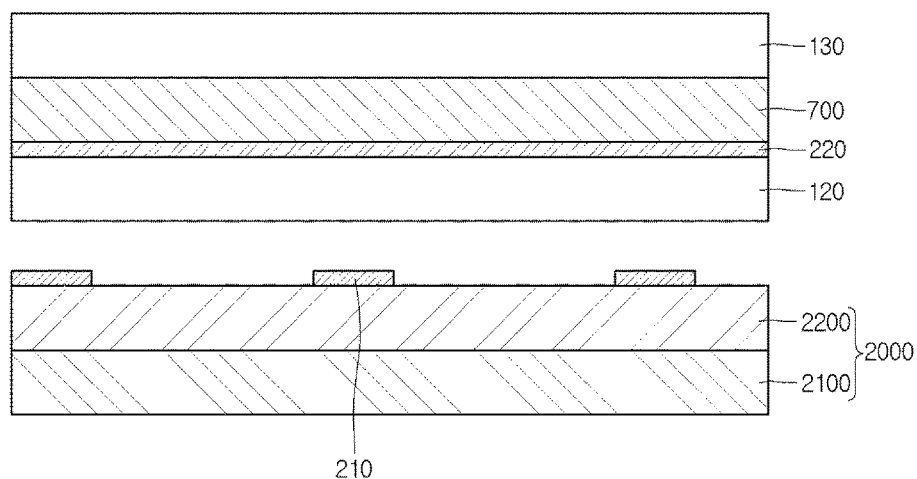
FIGS. 11 and 12 are views showing a touch device in which a touch window is coupled to a touch panel according to an embodiment.

Referring to FIG. 11, the display device according to the embodiment may include a touch window integrated with a display panel. That is, a substrate for supporting at least one electrode may be omitted.

In detail, at least one electrode may be disposed on at least one surface of the display panel 2000. The display panel 2000 may include the first and second substrates 2100 and 2200. That is, at least one electrode may be disposed on one surface of at least one of the first and second substrates 2100 and 2200.

Referring to FIG. 11, the first electrode 210 may be disposed on a top surface of the display panel 2200. In addition, the first wire connected to the first electrode 210 may be disposed. The intermediate layer 120, in which the second electrode and 220 and the second wire are disposed, may be formed on the display panel 2000 in which the first electrode 210 is disposed.

Although the second electrode 220 disposed on the top surface of the intermediate layer 120 and the cover substrate 130 disposed on the intermediate layer 120 while interposing the adhesive layer 700 are depicted in the drawings, the embodiment is not limited thereto, and the second electrode 220 may be formed on a rear surface of the intermediate layer 120.

That is, the embodiment is not limited to the drawings and is sufficient if the touch device has a structure in which the first electrode 210 is formed on the top surface of the display panel 200 and the intermediate layer 120 supporting the second electrode 220 is disposed on the display panel 700.

A polarizing plate disposed at a low portion of the intermediate layer 120 may be further included. The polarizing plate may be disposed between the intermediate layer 120 and the display panel 2000. In addition, the polarizing plate may be disposed at an upper portion of the intermediate layer 120.

The polarizing plate may be a linear polarizing plate or an anti-reflection polarizing plate. For example, when the display panel 2000 is a liquid crystal display panel, the polarizing plate may be a linear polarizing plate. In addition, when the display panel 2000 is an organic electroluminescent display panel, the polarizing plate may be an anti-reflection polarizing plate.

A touch device according to an embodiment may allow at least one substrate supporting a touch device to be omitted. For this reason, a touch device having a thin thickness and a light weight may be formed.

Hereinafter, a touch device according to still another embodiment will be described with reference to FIG. 12. In the following description, the parts similar or identical to those of the previously described embodiment will be omitted for the purpose of clear and brief description. The same reference numbers will be assigned to the same elements.

Figure 12:
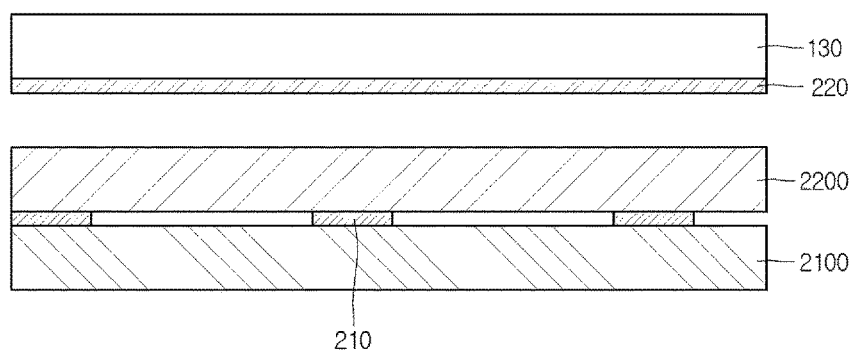

Referring to FIG. 12, a touch device according to still another embodiment may include a touch window integrated with a display panel. That is, a substrate for supporting at least one sensing electrode may be omitted, or all substrates for supporting sensing electrodes may be omitted.

For example, an electrode, which serves as a sensor disposed in an active area to sense a touch, and a wire, through which an electrical signal is applied to the electrode, may be formed inside the display panel. In detail, at least one electrode or at least one wire may be disposed inside the display panel.

The display panel includes first and second substrates 2100 and 2200. In this case, at least one of the first and second electrodes 210 and 220 is disposed between the first and second substrates 2100 and 2200. That is, at least one electrode may be formed on at least one surface of the first or second substrate 2100 or 2200.

Referring to FIG. 12, the first electrode 210 and the first wire may be formed between the first and second substrates 2100 and 2200. In addition, the second electrode 220 and the second wire may be formed on the intermediate layer 120. The intermediate layer 120 may be disposed on the display panel including the first and second substrates 2100 and 2200. That is, the first electrode 210 and the first wire may be disposed inside the display panel, and the second electrode 220 and the second wire may be disposed outside the display panel.

The first electrode 210 and the first wire may be disposed on the top surface of the first substrate 2100 or the rear surface of the second substrate 2200. In addition, the cover substrate 130 may be disposed on the intermediate layer 120.

In addition, a polarizing plate disposed at a lower portion of the intermediate layer 120 may be further included. For example, the polarizing plate may be interposed between the substrate and the display panel. In addition, the polarizing plate may be disposed at an upper portion of the intermediate layer 120.

When the display panel is a liquid crystal display panel and the sensing electrode is formed on the top surface of the first substrate 2100, the sensing electrode may be formed with a thin film transistor (TFT) and a pixel electrode. In addition, when the sensing electrode is formed on the rear surface of the second substrate 2200, a color filter layer may be formed on the sensing electrode or the sensing electrode may be formed on the color filter layer. When the display panel is an organic light emitting device and the sensing electrode is formed on the top surface of the first substrate 2100, the sensing electrode may be formed with a thin film transistor or an organic light emitting device.

The touch device according to another embodiment may allow an additional substrate supporting a touch device to be omitted. For this reason, the touch device having a thin thickness and a light weight may be formed. Hereinafter, one example of the touch device to which the touch window according to the above-described embodiment is applied will be described with reference to FIGS. 13 to 16.

Figure 13:
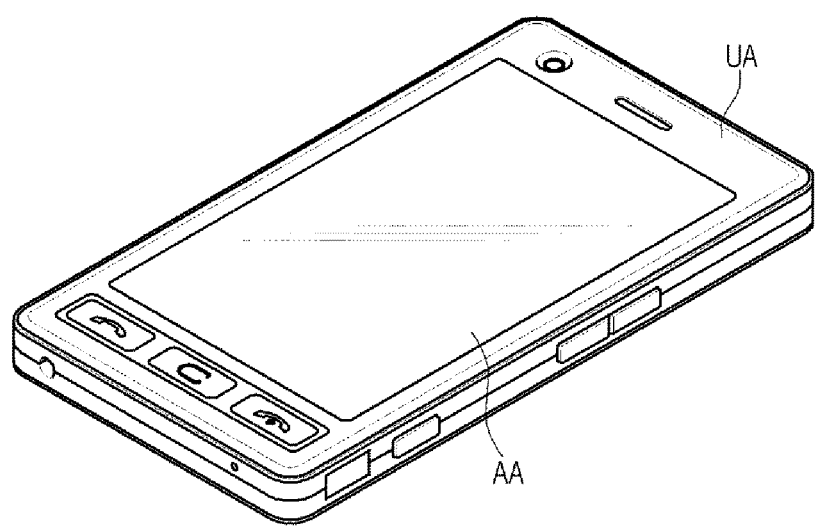
FIGS. 13 to 16 are views showing one example of a touch device to which a touch window is applied according to an embodiment.

Referring to FIG. 13, a mobile terminal 1000 is shown as one example of the touch device. The mobile terminal may include an active area AA and an unactive area UA. The active area AA may sense a touch signal through the touch by a finger, and a command icon pattern part and a logo may be formed in the unactive area UA.

Figure 14:
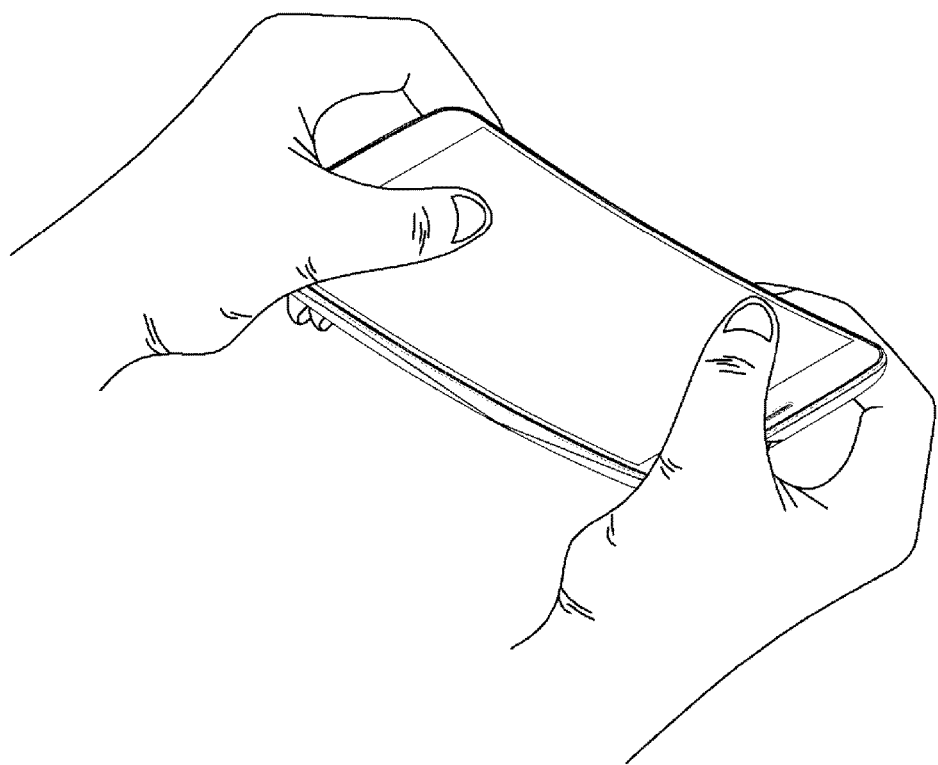

Referring to FIG. 14, the touch window may include a flexible touch window that is bendable. Accordingly, the touch device including the touch window may be a flexible touch device. Accordingly, a user can curve or bend the flexible touch window with a hand.

For example, the flexible touch window may be implemented for a wearable touch. That is, the flexible touch window may be applied to glasses or a clock, which is worn by a human body, to implement a wearable touch.

Figure 15:
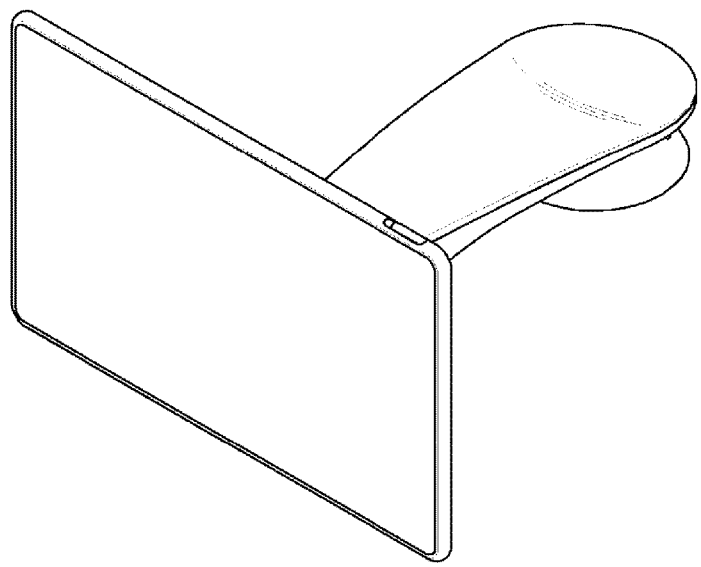

Referring to FIG. 15, the touch window may be applied to a vehicle navigation system as well as the touch device of a mobile terminal.

Figure 16:

In addition, referring to FIG. 16, the touch panel may be applied to an inner part of a vehicle. In other words, the touch panel may be applied to various parts in the vehicle. Accordingly, the touch panel may be applied to a dashboard as well as a PND (Personal Navigation Display), so that a CID (Center Information Display) may be realized. However, the embodiment is not limited to the above, and the display device may be used for various electronic appliances.

The embodiment is to provide a touch window which is bendable.

A touch window according to the embodiment includes a first electrode disposed on an electrode substrate to sense a position; an intermediate layer on the electrode substrate; and a second electrode disposed on the intermediate layer to sense a position, wherein a material of the electrode substrate is different from a material of the intermediate layer.

According to the embodiment, the touch window having a thin thickness through the intermediate layer may be secured and transmittance thereof may be improved. That is, the touch window according to the embodiment may have a reduced thickness as compared with a structure having two electrode substrates according to the related art. Specifically, since the intermediate layer may be substituted for one electrode substrate, the touch window having a thin thickness may be secured.

In addition, according to the related art, an optical clear adhesive (OCA) is additionally required between stacked electrode substrates. However, according to the embodiment, one electrode substrate is used and the electrode is directly formed on the intermediate layer, so that the optical clear adhesive may be omitted. Therefore, the cost may be reduced.

The electrode applied to a curved touch window or a flexible touch window may be prevented from being cracked. Therefore, the bending property and reliability of the touch window may be improved.

In addition, since the intermediate layer having a thin thickness is used, the first and second wires may be disposed on the same plane. Therefore, one single-sided circuit board may be used.

It will be understood that, when a layer (or film), a region, a pattern, or a structure is referred to as being "on" or "under" another substrate, another layer (or film), another region, another pad, or another pattern, it can be "directly" or "indirectly" on the other substrate, layer (or film), region, pad, or pattern, or one or more intervening layers may also be present. Such a position of the layer has been described with reference to the drawings.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch window comprising:
   an electrode substrate;
   an intermediate layer on the electrode substrate; and
   an electrode provided on the electrode substrate,
   wherein the electrode substrate is flexible,
   wherein the electrode includes a first electrode and a second electrode,
   wherein the electrode substrate includes a first surface and a second surface opposite the first surface,
   wherein the first and second electrodes are provided on the first surface of the electrode substrate,
   wherein the first electrode and the second electrode are configured to detect an input position,
   wherein the intermediate layer includes silicon (Si),
   wherein the electrode substrate is bent such that a first portion of the electrode substrate includes a flat surface and a second portion of the electrode substrate includes a curved surface,
   wherein an outer end of the electrode substrate includes the curved surface, and
   wherein at least one edge of the electrode substrate includes an edge surface that is inclined to be greater than 0 degrees and less than 90 degrees relative to the flat surface of the electrode substrate.

2. The touch window of claim 1, wherein the electrode substrate includes a polyethylene terephthalate (PET).

3. The touch window of claim 1, wherein the first and second electrodes include chrome (Cr), nickel (Ni), copper (Cu), aluminum (Al), silver (Ag), molybdenum (Mo), and an alloy thereof.

4. The touch window of claim 1, wherein the first and second electrodes include conductive pattern, and the first and second electrodes are disposed in a mesh shape.

5. The touch window of claim 4, wherein the first and second electrodes include a pattern opening and a pattern line.

6. The touch window of claim 5, wherein a line width of the pattern line is in the range of 1 μm to 5 μm.

7. The touch window of claim 1, further comprising a wire connected with the electrode,
   wherein the electrode and the wire are the same material.

8. The touch window of claim 7 wherein the wire includes chrome (Cr), nickel (Ni), copper (Cu), aluminum (Al), silver (Ag), molybdenum (Mo), and an alloy thereof.

9. The touch window of claim 1, wherein a thickness of the electrode is in the range of 1 μm to 6 μm.

10. The touch window of claim 1, wherein a material of the electrode substrate is different from a material of the intermediate layer.

11. The touch window of claim 1, wherein a thickness of the electrode substrate is different from a thickness of the intermediate layer.

12. The touch window of claim 1, wherein a first area for the first electrode is defined on the electrode substrate, a second area for the second electrode is defined on the intermediate layer, and the second area is smaller than the first area.

13. The touch device of claim 1, further including a cover window on the electrode substrate.

14. The touch window of claim 13, wherein the cover substrate, the second electrode, the intermediate layer, the first electrode, and the electrode substrate are sequentially illuminated.

15. A touch device comprising:
    a display panel; and
    a touch window on the display panel;
    wherein touch window includes:
      an electrode substrate;
      an intermediate layer on the electrode substrate; and
      an electrode provided on the electrode substrate;
    wherein the electrode substrate is flexible,
    wherein the electrode includes a first electrode and a second electrode,
    wherein the electrode substrate includes a first surface facing the display panel and a second surface opposite the first surface,
    wherein the first and second electrodes are provided on the second surface of the electrode substrate,
    wherein the first electrode and the second electrode are configured to detect an input position,
    wherein the intermediate layer includes silicon (Si), wherein the display panel and the electrode substrate are bent such that a first portion includes a flat surface and a second portion includes a curved surface, wherein an outer end of the display panel and the electrode substrate include the curved surface, and wherein at least one edge of the electrode substrate includes an edge surface that is inclined to be greater than 0 degrees and less than 90 degrees relative to the flat surface.

16. The touch device of claim 15, wherein the display panel includes a first substrate;

a thin film transistor and an organic light-emitting device on the first substrate; and a second substrate on the first substrate.

17. The touch device of claim 16, wherein the second substrate is an encapsulation layer.

18. The touch device of claim 16, further including a cover window on the second substrate.

19. The touch device of claim 18, wherein the first and second electrodes are provided between the cover window and the first surface of the electrode substrate, wherein the cover window includes a glass, wherein the cover window is bent such that a first portion includes a flat surface and a second portion includes a curved surface, and wherein an end of the cover window includes the curved surface.

20. The touch device of claim 15, wherein a material of the electrode substrate is different from a material of the intermediate layer.

* * * * *